United States Patent [19]

Heijs et al.

[11] 4,288,319

[45] Sep. 8, 1981

[54] METHOD OF AND ARRANGEMENT FOR DE-INKING FIBER

[75] Inventors: Karel A. G. Heijs; Antonius J. Dechamps, both of Gennep; Robert L. de Jong, Boxmeer, all of Netherlands

[73] Assignee: N.V. Papierfabriek Gennep, Gennep, Netherlands

[21] Appl. No.: 118,590

[22] Filed: Feb. 4, 1980

[30] Foreign Application Priority Data

Feb. 5, 1979 [DE] Fed. Rep. of Germany ....... 2904326

[51] Int. Cl.³ ......................... B03D 1/02; B03D 1/24
[52] U.S. Cl. ................................... 209/166; 209/170; 210/704; 210/221.2
[58] Field of Search ................................ 209/164–168, 209/170; 210/44, 221 P, 703, 704, 221.2

[56] References Cited

U.S. PATENT DOCUMENTS

| | | | |
|---|---|---|---|
| 1,176,428 | 3/1916 | Callow | 209/170 X |
| 1,478,703 | 12/1923 | Dolbear | 209/168 |
| 3,032,199 | 5/1962 | Sumiya | 209/170 |
| 3,428,175 | 2/1969 | Hukki | 209/164 |
| 3,642,617 | 2/1972 | Brink et al. | |
| 4,013,505 | 3/1977 | Balcar et al. | 209/166 X |

FOREIGN PATENT DOCUMENTS

1517227 2/1969 Fed. Rep. of Germany.
2813448 9/1978 Fed. Rep. of Germany.
2836496 2/1980 Fed. Rep. of Germany.

Primary Examiner—William A. Cuchlinski, Jr.
Attorney, Agent, or Firm—Toren, McGeady and Stanger

[57] ABSTRACT

A pulp suspension is de-inked by way of flotation after the suspension is chemically treated to remove impurities. Air is supplied to the chemically treated suspension so as to generate a foam containing the impurities on the surface of the liquid level of the suspension. The foam is drawn off closely above the liquid level and quenched, and an upper layer of the pulp suspension beneath the foam is discharged so as to remove fiber fines contained in the upper layer. Accordingly, the pulp suspension is purified more quickly and effectively than with prior arrangements wherein the foam and the fiber fines were not separately removed.

14 Claims, 5 Drawing Figures

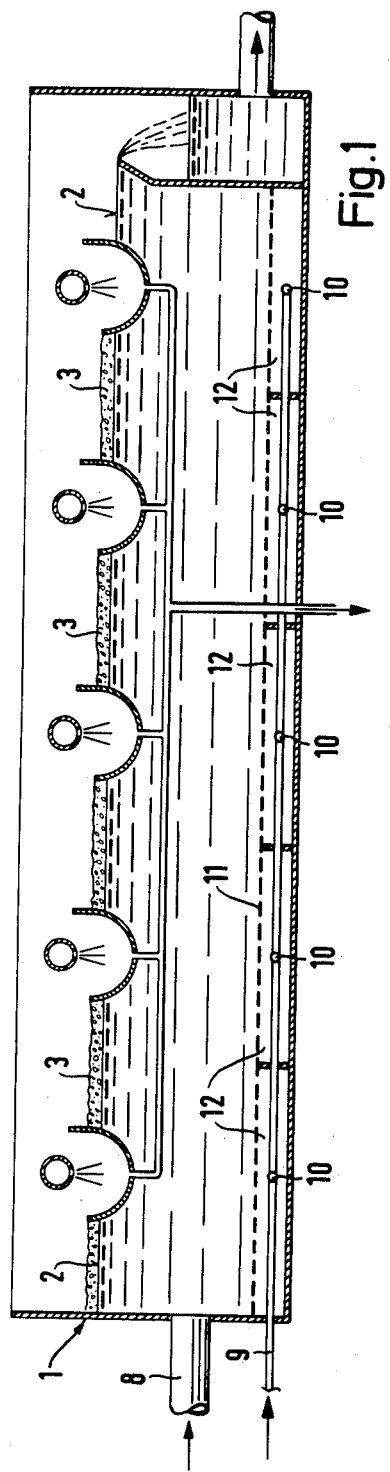
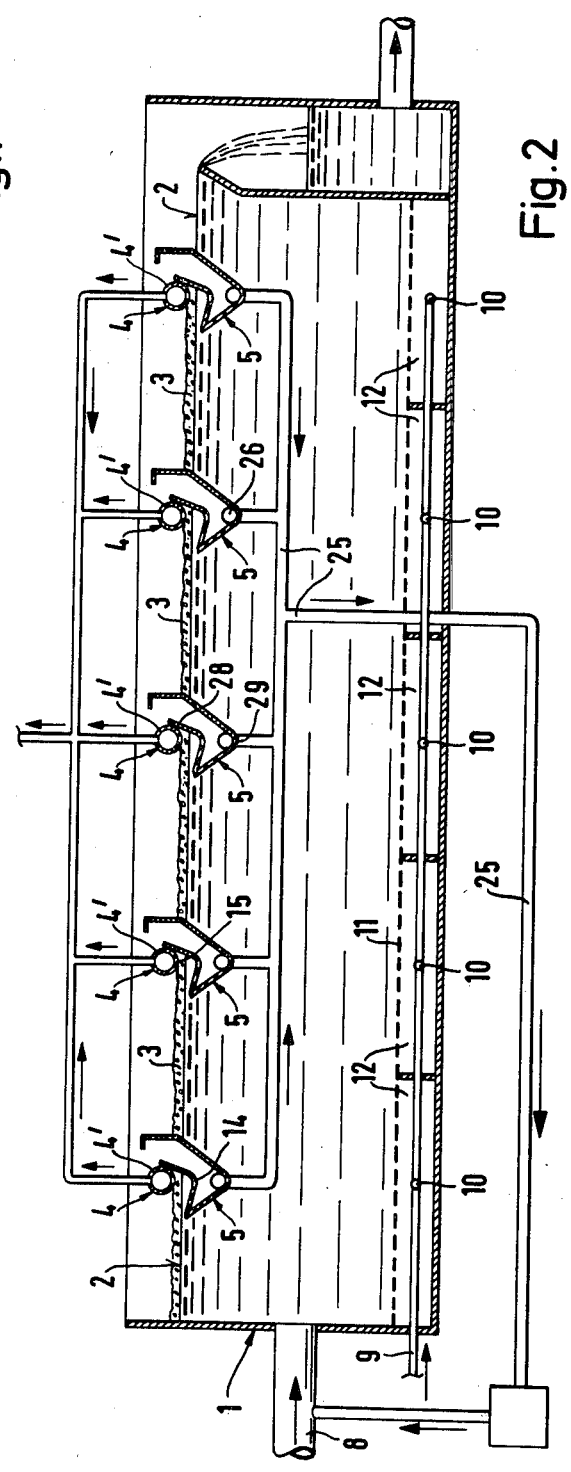

METHOD OF AND ARRANGEMENT FOR DE-INKING FIBER

The invention relates to a method and an arrangement for the de-inking of pulp suspensions by means of flotation, wherein the pulp suspension, after treatment with chemicals, floats through a supply of air to the bottom region of a basin or tank and is purified of suspended impurities, such as printing inks, binders and pigments. The arrangement is composed of a tank whose bottom region is at least partially provided with aeration units which are fed with air and, in the region of the liquid level of the pulp suspension, is equipped with means for drawing off the impurities.

Flotation arrangements of this type are used for de-inking, i.e., for removing printing ink and ash from waste paper and are known, for example, from German Offenlegungsschrift No. 21 61 015. In this case, the air flows through the openings in the bottom and the printing ink, etc. is deposited on the air bubbles and floats in the form of foam on the pulp suspension of waste paper. In accordance with the German Offenlegungsschrift No. 21 61 015, this foam is removed by means of paddles. In another known arrangement according to German Auslegeschrift No. 24 09 235 of analogous construction, the foam is forced into troughs by means of spray tubes which are arranged below the liquid level.

These two known arrangements have in common the disadvantage that the foam is either not completely removed from the surface of the pulp suspension or that, together with the foam, usually a significant portion of pulp suspension is drawn off, or is paddled off by means of the paddles, through the foam troughs. In addition to a large amount of fiber fines, the pulp suspension contains a significant portion of broken fiber particles which can be utilized for the treatment process, but have a greater degree of impurity than the remaining fibers in the pulp suspension and, thus, in the flotation arrangement. When the portion of fines is not removed, this results in the entire pulp suspension undergoing a significant loss of whiteness and, thus, of quality.

The present invention is based on the task of purifying a pulp suspension so that a high degree of whiteness and, thus, a high degree of purity is ensured without having to separate or circulate large amounts of pulp suspension, wherein, simulataneously, the treatment of the fines is to be ensured.

This task is solved by a method for the de-inking of pulp suspensions by means of flotation, wherein the pulp suspension, after treatment with chemicals, floats through a supply of air and is purified of suspended impurities, such as printing inks, binders and pigments. The foam generated during flotation is drawn off closely above the liquid level and is killed or quenched, and the upper layer of the pulp suspension is discharged.

The method advantageously is carried out in an arrangement which is composed of a tank whose bottom region at least partially is provided with aeration units which are fed with air and, in the region of the liquid level of the pulp suspension, is equipped with means for drawing off the impurities. The arrangement includes at least one drainage element extending, closely above the liquid level, essentially transversely over the entire width of the tank, the drainage element serving for the removal of the foam laden with impurities. The arrangement also includes at least one discharge channel extending, closely below the liquid level, essentially transversely over the entire width of the tank, the discharge channel serving for the removal of the fines for the region of the pulp suspension adjacent to the liquid level.

By arranging the drainage elements closely above the liquid level, it is ensured that only foam is drawn off and no liquid which contains the fines. The entire drawn-off foam is killed, i.e. it is decomposed into its component coloring agents and water, without involving large amounts of water, as is the case in the conventional foam quenching. In the previously known units, foam and fines are initially paddled from the surface or are sprayed into channels and thereby destroyed. However, in both cases, this results in a significant dilution. Moreover, large amounts of fines, i.e. impurities, binder and broken fiber particles and fibers, are entrained. In order to recover the fibers, this entire highly impure reject flow must be floated once again.

In accordance with the invention, on the other hand, the arrangement of the discharge channels closely below the liquid level causes the foam to act separately on the floated fines. Broken fiber particles which still have a greater degree of impurity, however, no longer contain the coloring agents and impurities bound to the foam. Accordingly, the reject flow, obtained in the method according to the invention, is an essentially clean material which is already free of coloring agents. The reject flow is of a small volume because the foam which has not been quenched, is not in this reject flow.

In accordance with an advantageous embodiment of the invention, the drainage elements are tubes with holes or slots which are subjected to a vacuum of 0.5–2 m column of water. The tubes are arranged at a distance of preferably 10–50 mm above the liquid level, wherein, by the selected vacuum range, it is ensured that all the developing foam, but no liquid is drawn off. It is advantageous to use tubes with holes because these tubes per se are commercially available at very low cost and because the vacuum can be maintained uniformly over the entire length of the tube by providing holes of different size and shape. Moreover, tube structures are very stable, so that the drainage elements can be mounted, without any additional support, directly by means of holding members, for example, on a flotation tub. The tube with holes advantageously is mounted in such a way that a vertical adjustment, i.e. its distance from the liquid level of the pulp suspension, is possible. The vertical adjustment allows for an adjustment with respect to the developing foam, the development depending not only on the type and amount of purifying chemicals added, but also on the addition of air. Of course, the development of foam also depends on the raw stock utilized for the pulp suspension, that is, it depends generally on the composition of the waste paper to be purified.

A purified embodiment of the invention provides that the discharge channels are constructed as tube sections which are provided, on their upper sides and distributed over their lengths, with openings for discharging the fines. In this respect, the term "tube section" is understood to be a hollow member whose cross section has an—although remote—similarity to an L-section and in which the shorter side is arranged parallel or slightly inclined to the liquid level and which has, on its upper surface, the above-mentioned openings for discharging the fines. The short side is fully immersed in the pulp suspension and is directed oppositely to the direction of flow. The longer side projects above the liquid level and above the foam layer on top of this level and, thus, forms a type of retaining plate. The fines and broken fiber particles which are laden with air do not fully reach the surface, i.e. the liquid level, but they form a layer which drifts underneath the liquid level and, through the openings, reaches the interior of the tube section. It is thereby simultaneously ensured that foam possibly accumulating above the openings is retained until it is fully drawn off and possibly settling particles cannot return into the pulp suspension, but are discharged through the openings in the tube section. Preferably, the discharge channels have a hook-like cross section and the openings are arranged in the lowermost portion of the hook. As a result of the hook-shaped section, the entering pulp suspension which flows over the edge of the hook is immediately delivered to the lowermost areas and, thus, to the discharge bores, the size of these bores determining the amount of liquid to be discharged. The hook-shape further ensures that dissipating foam cannot return into the already purified pulp suspension, but is caught in the region of the hook and, thus, is discharged through the outlet openings. Simultaneously, a portion of the hook which projects above the liquid level serves as a retaining plate for the foam, so that it can be safely avoided that foam particles are carried behind the draw-off point. Another advantage of the hook-shaped design of the discharge channels is to be seen in the fact that, due to the rounded surfaces, the resistance to flow is only slightly changed, i.e. the purified pulp suspension can flow underneath the discharge channel, while fines and broken fiber particles which are laden with air are drawn off from the surface.

In accordance with an advantageous embodiment of the invention, the openings are bores whose distances from one another decrease toward the end regions of the tank. As is well known, the flow of the pulp suspension in the tank is always decelerated at the walls, so that, in these areas, it is easily possible that dirt residues of the foam and the upper region of the pulp suspension can settle. By a denser arrangement of bores in the end regions of the discharge channels, the flow rate is accelerated in these regions and, thus, reaches essentially the same flow rate as the pulp suspension in the middle of the de-inking tank, i.e., for example, on the de-inking tub, so that the dirt particles do not settle on the walls of the tank.

The number and size of the bores arranged in the discharge channel predetermine the amount which is to be drawn off from the surface of the pulp suspension. It is of essential importance in this connection that this exactly predetermined amount be drawn off without hindrance, because, otherwise, it would not be ensured that a constant amount always is drawn off. Therefore, an especially preferred embodiment of the invention provides that the discharge channel has a clear discharge opening whose cross-sectional area is greater than the sum of the cross-sectional areas of the openings.

In accordance with an advantageous embodiment of the invention, the drainage element, or the drainage elements, are arranged at a height of 10 to 50 mm above the liquid level. In accordance with a preferred embodiment, this distance is adjustable. This distance depends on the type and amount of chemicals used, and on the composition of the raw stock, i.e. waste paper, utilized for the pulp suspension.

The discharge channel as such does not have to be adjustable in its height relative to the liquid level. However, due to the fact that the pulp suspension must flow over a significant distance in flotation tubs, the friction inevitably causes a drop of the liquid level, i.e. the liquid level at the inlet region in a flotation tub is higher than at the outlet region. Therefore, an especially preferred embodiment of the invention provides that the discharge channel is combined with the drainage element in a composite unit which is adjustable in its height relative to the liquid level. In this manner, the discharge channel can be easily adjusted in its height relative to the respective liquid level. Simultaneously, this has the result that the drainage element maintains the once chosen distance between the liquid level and the tube which is provided with slots or holes.

In accordance with another preferred embodiment of the invention, the drainage element or elements are connected to a retaining plate within the composite unit. This retaining plate advantageously is a portion of the discharge channel which is constructed as a tube section and can be an open as well as a closed section. When it must be expected that a significant amount of foam could be developed, for reasons of safety, the selection of an open section for the discharge channel is advisable, so that, should the foam rise above the retaining plate, this foam is received by the interior of the discharge channel and is removed. Thus, it is safely avoided that the highly impure foam be returned to the already purified pulp suspension. However, in the normal case, it should be possible to directly discharge the foam by regulating the drawing-off capacity so that the open discharge channel merely represents an additional safety measure at the time of the start-up of the de-inking tube or of analogous units.

Chemicals are used in practically all de-inking methods; these chemicals have their highest efficiency at an increased temperature of the pulp suspension. Accordingly, the pulp suspension must be heated; the most advantageous temperature range was found to be about 40° C.+10°. As a result of the previous, conventional flotation by means of externally supplied air or with the aid of air in the building, i.e. room air, the pulp suspension is cooled; this cooling is undesirable. Simultaneously, during each flotation procedure, a significant amount of moisture escapes into the surroundings of the flotation device because the air leaves the de-inking arrangement saturated with moisture. Therefore, a very advantageous embodiment of the invention provides that the air accumulating during the drawing-off of the foam is utilized as blowing air for the flotation. As a result, the air is circulated, i.e. the air is cooled only insignificantly and, thus, also the pulp suspension is cooled only insignificantly. Another enormous advantage resides in the fact that, by drawing off the foam above the pulp suspension in the region of the liquid level, in addition to the foam, exactly that air is drawn off which has the highest moisture content. As a result, the room in which the de-inking plate is arranged is charged with a significantly smaller amount of moisture, i.e. it is subjected to corrosion to a much lesser degree.

An advantageous embodiment of the invention provides that the drawn-off foam is centrifuged and, thus, is thickened. The foam fed into the centrifuge is initially killed by means of the centrifugal force, i.e., the foam collapses and a turbid liquid is obtained from the foam and the dirt particles deposited therein. This turbid liquid is separated in the centrifuge into water and solids. This results in significant thickening. As a result, only a relatively small amount of waste must be discharged.

The fines discharged through the discharge channels still contain a large amount of broken fiber particles which are still usable. The already performed separation of the foam from this material, called the reject flow, has the result that the reject material is already substantially purified. Therefore, in many cases, a separate treatment of this reject material is unnecessary and it can be returned directly to the de-inking plant, without causing a deterioration of the whiteness in the entire pulp suspension.

The de-inking method and also the de-inking arrangement can be described particularly well in connection with a flotation tub.

Therefore, the following table shows the obtainable whiteness values between a conventional de-inking tub and a de-inking tub which is equipped with the systems according to the invention.

| | Flotation Tub | | | | | | |
|---|---|---|---|---|---|---|---|
| | State of the Art | | | According to invention | | | |
| Flow Rate m³/h | 310 | 34 | 276 | 310 | 29 | 5.4 | 276 |
| Consistency % | 0.78 | 0.94 | 0.76 | 0.78 | 0.68 | 2.38 | 0.76 |
| Solids content | 2418 | 320 | 2098 | 2418 | 197 | 129 | 2092 |
| Ash % | 14.8 | 36.8 | 11.6 | 14.8 | 19.1 | 52.5 | 11.6 |
| Ash kg/h | 358 | 115 | 243 | 358 | 38 | 68 | 243 |
| Whiteness GE | 71.3 | 63.8 | 71.9 | 71.3 | 70.1 | 52.8 | 74.9 |
| | Raw Stock = Influent | Reject I = Foam + Top Layer paddled off | Accept I | Influent | Reject II | Foam | Accept II |

In flotation tubs according to the state of the art, the foam is discharged together with liquid. In accordance with the invention, foam and liquid are discharged separately. As the table shows, a reflection improvement of from 71.9 to 74.9 degrees GE is obtained. This significant improvement results from the fact that the coloring agents are no longer circulated, but are directly discharged through the foam. The separate foam discharge has the additional advantage that only small volumes must be handled, i.e. 5.4 m³/h are fed to the centrifuge, instead of the previously required input of 34 m³/h. The amount discharged according to the state of the art, i.e. 34 m³/h, was so great that a separate flotation cell had to be connected in order to further treat the pulp still present in this material. The separately drawn-off foam contains practically no coloring agents, so that, after separating the water from the foam, the remaining dirt can be destroyed directly. Another advantage results from the fact that the foam has a high concentration of solids, namely 2.38% which corresponds to 129 kg/h, whereas, in the past, with the mixed discharge of foam and liquid, only a concentration of 0.94 could be obtained which corresponds to a solids content of 320 kg/h; simultaneously, this means that, in this case, too many good fibers were discharged.

The table further shows that the foam now carries 52.5% ash and that this ash is removed directly. Ash must always be removed from the pulp suspension, because this ash is the carrier of the coloring agent particles, i.e. it directly influences the whiteness. The ash content of 52.5% compares with the ash content of 36.8% of the previously used foam-liquid mixture. This 36.8% correspond to 115 kg/h which, in the past, had to be treated separately. However, the foam discharged today already contains 68 kg/h ash. In other words, 60% of the ash which, in the past, had been discharged as a mixture of foam and liquid is today discharged through the foam alone and is immediately eliminated from circulation. This becomes clear from the low reflection of 52.8% as compared to 63.8% of the test sheets from the mixture of foam and liquid. Furthermore, it is worth noting that only a small amount of fibers is lost through the foam. This follows from the composition of the foam. With an hourly discharge of 129 kg foam, this foam contains 68 kg ash. The remaining differential amount of fiber particles is 61 kg which, relative to the original amount by weight of 2418 kg/h, results in a loss of 2.5%. The analogous computation for the state of the art results in a loss of 8.5%.

In the following, the invention shall be explained with the aid of the drawing:

FIG. 1 shows a basic sectional diagram of a previously used flotation tub,

FIG. 2 shows a flotation tub, in section with the arrangements according to the invention.

Figure 3:
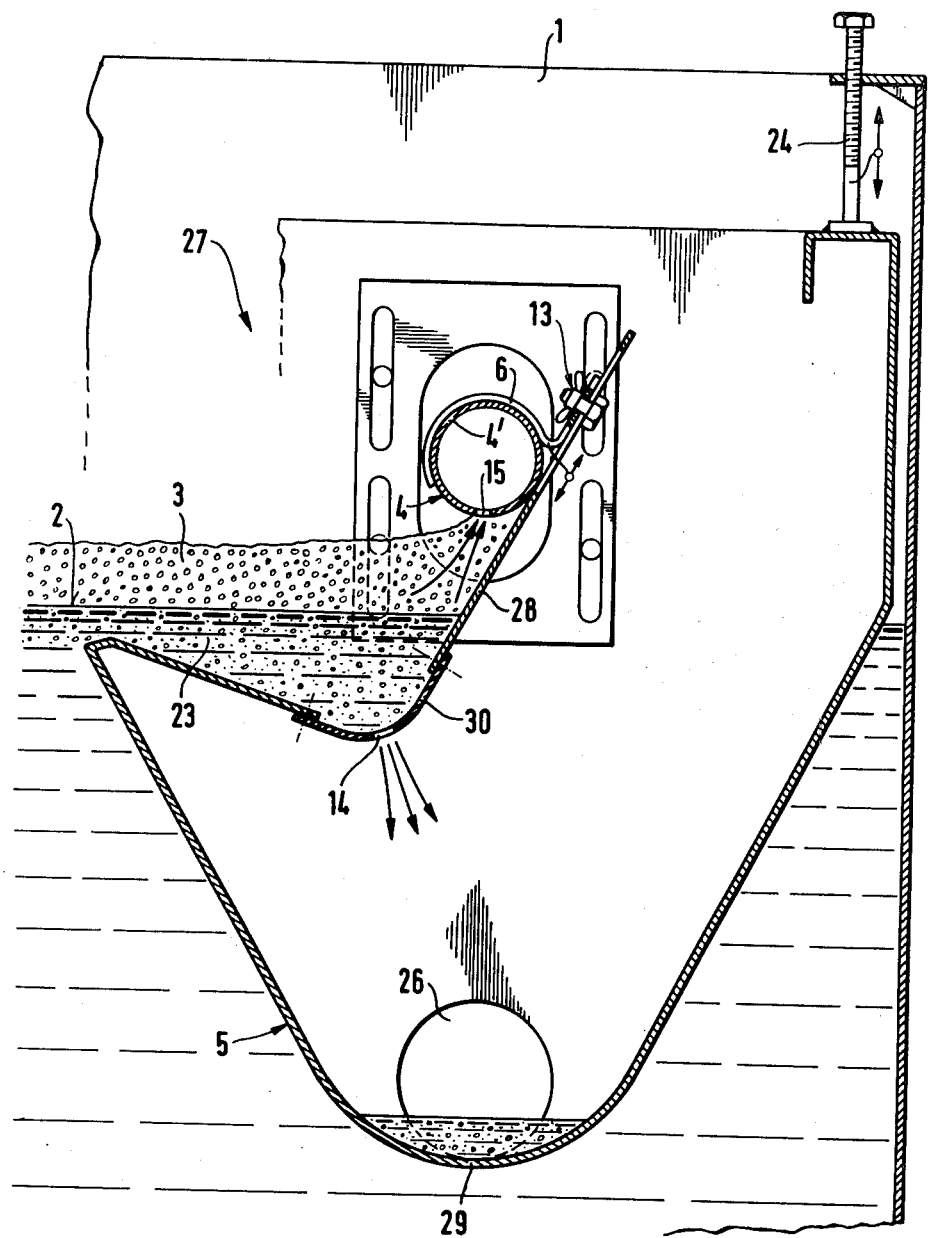
FIGS. 3 and 4 show enlarged partial sectional views of embodiments of a composite unit according to the invention.
Figure 4:
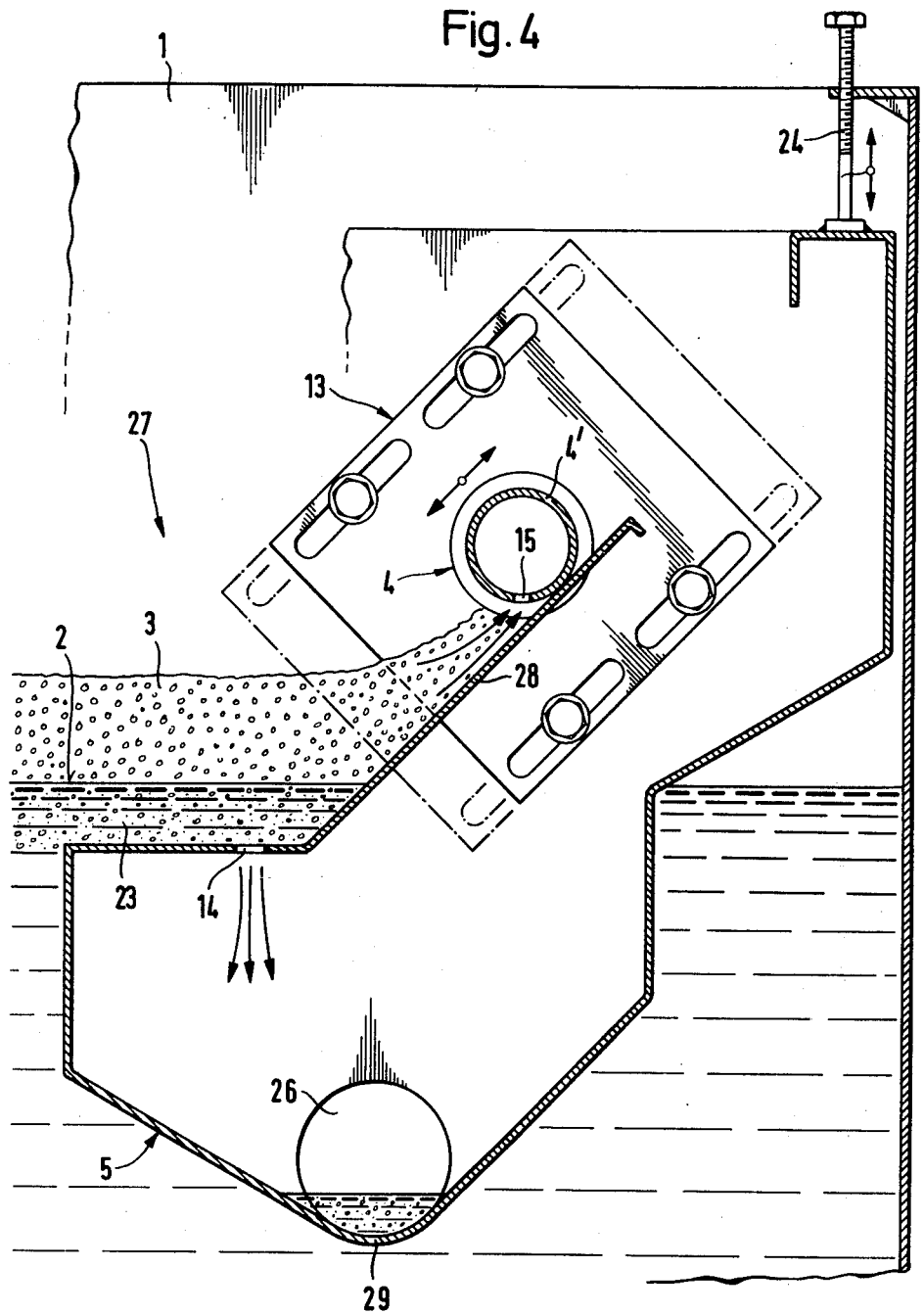

In FIGS. 1 and 2, prepared pulp suspension to which chemicals have been added is fed to the flotation tub 1 through the inlet pipe 8. The pressure pipe 9 conducts the air required for foaming the pulp suspension through the distributing pipe 10 to the screen bottom 11 which covers the air chambers 12. The air rising through the pulp suspension forms small bubbles on whose periphery the coloring agents and pigments are depositing, wherein the larger bubbles rise above the liquid level 2 and form a layer of foam 3. This layer of foam 3 contains the darkest impurities and a large amount of the pigments of the pulp suspension. In the arrangement of FIG. 2, this layer is drawn from the liquid level 2 by means of drainage elements 4, constructed as tubes 4' with holes. The height of the drainage elements 4 relative to the liquid level 2 is adjustable by means of adjusting devices 13 (FIGS. 3 and 4) and, by rotating the tube 4', the elements can be adjusted so that their bores 15 are directed in the desired direction, i.e. various angles relative to the liquid level 2.

Figure 5:
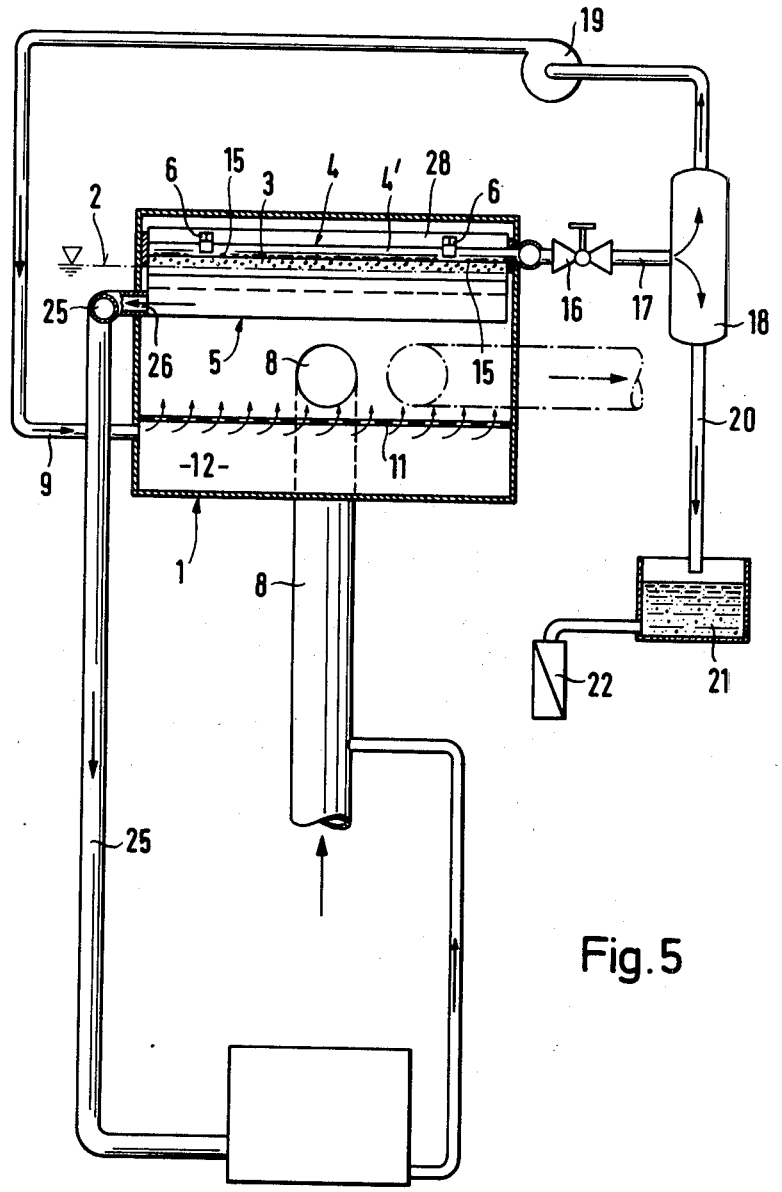
FIG. 5 shows a circulation diagram of a de-inking plant.

From the drainage elements 4, the foam 3, after passing a valve 16 (FIG. 5), reaches the collecting pipe 17 to which all the drainage elements 4 of the flotation tub 1 are connected and which represents the connection between the flotation tub 1 and a separator 18. This separator 18 serves for killing the foam and can be constructed as a centrifuge. The separator 18 is connected to a vacuum pump 19 which provides the required vacuum in the drainage elements 4 and, simultaneously, returns to the flotation tub 1 in the form of compressed air the air drawn from the drainage element 4. This results in a circulation which is extremely economical and reduces to a minimum the influence of moisture resulting from evaporation at the place of installation of the flotation tub.

The separator 18 is connected to a gravity pipe 20 through which the foam 3, in the form of killed waste water, is conducted in the basin 21. From this basin 21, the waste water reaches another centrifuge 22 which separates the impurities. The water pre-treated in this manner is conducted to the water treatment plant and the separated impurities are dumped.

As is well known, air bubbles of different size are formed during the flotation of the pulp suspension. A portion of these air bubbles on which broken fiber particles have deposited and which also contain a large amount of fines, does not rise above the liquid level 2 in the form of foam, but forms closely below this level a layer of fines 23 in which a large amount of very fine air bubbles are dispersed. This layer drifts closely below the liquid level 2 and is conducted into the discharge channels 5 as a result of the movement of the pulp suspension. The discharge channels 5 have a hook-shaped cross-section and, in the lowermost region of the inner hook surface, they have openings 14. In connection with the depth of immersion of the discharge channel 5, the size of these openings determines the flow through the openings and, thus, the amount of pulp suspension which is discharged as the layer of fines 23. The material which has passed, i.e. the reject, flows on the channel bottom 29 and, through the discharge openings 26, reaches the return pipe 25 from where it is conducted to the inlet pipe 8.

The composite unit 27 consisting of the drainage element 4 and the discharge channel 5 can be adjusted to the varying level in the flotation tub 1 by means of a raising and lowering device 24. In the normal case, this adjustment is required only once and must only be performed again when the flow rate is changed.

By means of a clip 6, the tube 4′ with holes is fastened to the retaining plate 28 which is connected to the discharge channel through a rubber apron 30. The rubber apron 30 (FIG. 3) has openings 14 which have a diameter of 15 mm. Ten of these holes are arranged over the entire length of the discharge channel 5, wherein the smallest hole spacing toward the side wall of the flotation tube 1 is 50 mm. However, five of these ten holes 14, i.e. every second hole, are provided with blind plugs, so that only five holes serve for the discharge of the upper region of the pulp suspension in which the fines are dispersed. By opening or closing additional holes, it is possible to regulate the amount of the layer of fines 23 to be discharged, i.e. the amount can be adjusted to the influent raw stock of waste paper. Of course, this regulation, i.e. the increased or reduced discharge, changes the level of the pulp suspension in the container when the influent of pulp suspension remains equal, so that the composite units 27 must be readjusted by means of the raising and lowering device 24.

We claim:

1. A method of de-inking pulp suspension by way of flotation comprising the steps of chemically treating the pulp suspension, supplying air at a particular level below the liquid level of the chemically treated pulp suspension thereby purifying it of suspended impurities by generating a foam containing the impurities on the surface of the liquid level of the suspension, drawing off the foam closely above the liquid level, quenching the drawn-off foam, and separately discharging, simultaneously with said drawing off step and above the level at which said air supplying step is performed, an upper layer of the pulp suspension directly beneath the liquid level thereby removing fiber fines contained in the upper layer.

2. The method of claim 1, including performing said drawing-off step by circulating air and using the circulated air in said air supplying step.

3. The method of claim 1, including centrifuging the drawn-off foam thereby thickening same.

4. The method of claim 1, including containing the pulp suspension in a de-inking tank, arranging discharge channels in the de-inking tank in the vicinity of the upper layer of the pulp suspension, discharging the upper layer including the fiber fines through the discharge channels, and returning the fiber fines to the de-inking tank thereby renewing flotation of the fiber fines.

5. An arrangement for de-inking a pulp suspension by way of flotation comprising a tank of given width for containing the suspension, aeration means in the bottom region of said tank for supplying air at a particular level below the liquid level of the suspension to produce a foam containing impurities on the surface of the liquid level of the suspension, means in said tank arranged to be in the region of the liquid level of the pulp suspension for discharging the impurities, said discharging means including at least one elongated drainage element arranged to extend closely above the liquid level and substantially transversely of the entire width of said tank for discharging the foam, and at least one discharge channel arranged to extend substantially transversely of the entire width of said tank, closely below the liquid level and above the level at which air is supplied to the suspension by said aeration means, for separately discharging fiber fines contained in a layer of the pulp suspension directly beneath the liquid level.

6. An arrangement for de-inking a pulp suspension according to claim 5, wherein said drainage elements each comprise a tube having a number of openings through its circumferential wall and including means for evacuating each said drainage element to a vacuum of between about 0.5 to 4 m column of water.

7. An arrangement for de-inking a pulp suspension according to claim 6, wherein said drainage elements are each arranged to be at a height of between about 10 to 50 mm above the liquid level.

8. An arrangement for de-inking a pulp suspension according to claim 6, wherein said discharge channel has a discharge opening of a cross-sectional area which is larger than the sum of the cross-sectional areas of said openings in said upper wall of said tubular section.

9. An arrangement for de-inking a pulp suspension according to claim 5, wherein said discharge channels each comprise an elongated tubular section having an upper wall with a number of openings provided in said upper wall over the length of said tubular section for discharging the fiber fines from the layer beneath the liquid level through said tubular section.

10. An arrangement for de-inking a pulp suspension according to claim 9, wherein each said upper wall has a hook-shaped cross-section transversely of the longitudinal axis of said tubular section and said openings in said upper wall are arranged in the lowermost portion of said hook-shaped cross-section relative to the liquid level.

11. An arrangement for de-inking a pulp suspension according to claim 9, wherein said openings in said upper wall are substantially circular and the distance between adjacent ones of said openings in said upper wall decreases in the direction toward the ends of said elongated tubular section.

12. An arrangement for de-inking a pulp suspension according to claim 5, wherein said discharge channel and said drainage element together form a composite assembly, and including means for vertically adjusting said assembly relative to the liquid level.

13. An arrangement for de-inking a pulp suspension according to claim 12, wherein said composite assembly includes a retaining plate forming a part of said upper wall for supporting said discharge element.

14. An arrangement for de-inking a pulp suspension according to claim 5, including means for adjusting the distance between said drainage element and said discharge channel.

* * * * *